United States Patent
Jain et al.

(10) Patent No.: US 6,506,351 B1
(45) Date of Patent: *Jan. 14, 2003

(54) REMOVAL OF NITROGEN OXIDES FROM GAS STREAMS

(75) Inventors: Ravi Jain, Bridgewater, NJ (US); James K. Tseng, Berkeley Heights, NJ (US); Shuen-Cheng Hwang, Chester, NJ (US); Mark H. Anderson, Bethlehem, PA (US); Robert Francis Workosky, Macungie, PA (US)

(73) Assignee: The BOC Group, Inc., Murray Hill, NJ (US)

( * ) Notice: Subject to any disclaimer, the term of this patent is extended or adjusted under 35 U.S.C. 154(b) by 2 days.

This patent is subject to a terminal disclaimer.

(21) Appl. No.: 09/635,743

(22) Filed: Aug. 11, 2000

(51) Int. Cl.$^7$ .................................................. B01J 8/00
(52) U.S. Cl. ............................... 423/239.1; 423/239.2; 423/400
(58) Field of Search ............................... 423/239.2, 400, 423/402, 235, 239.1

(56) References Cited

U.S. PATENT DOCUMENTS

| | | | |
|---|---|---|---|
| 4,011,298 A | 3/1977 | Fukui et al. | |
| 4,119,703 A | 10/1978 | Nishida et al. | |
| 4,247,321 A | 1/1981 | Persinger | |
| 4,975,256 A | 12/1990 | Hegedus et al. | |
| 5,206,002 A | 4/1993 | Skelley et al. | |
| 5,233,934 A | 8/1993 | Krigmont et al. | |
| 5,266,292 A | 11/1993 | Bagg et al. | |
| 5,316,737 A | 5/1994 | Skelley et al. | |
| 5,318,763 A | 6/1994 | Bagg et al. | |
| 5,453,258 A | 9/1995 | Lippmann et al. | |
| 5,482,692 A | 1/1996 | Audeh et al. | |
| 5,589,147 A | 12/1996 | Farnos et al. | |
| 5,612,010 A | 3/1997 | Pandey et al. | |
| 5,743,929 A | 4/1998 | Kapoor et al. | |
| 6,056,928 A | * 5/2000 | Fetzer et al. | 423/235 |
| 6,117,403 A | * 9/2000 | Alix et al. | 423/210 |
| 6,136,284 A | 10/2000 | Hwang et al. | |
| 6,162,409 A | * 12/2000 | Skelley et al. | 423/239.1 |

FOREIGN PATENT DOCUMENTS

DE WO-9710042 A1 * 3/1997 ........... B01D/53/56

\* cited by examiner

*Primary Examiner*—Wayne A. Langel
*Assistant Examiner*—Edward M. Johnson
(74) *Attorney, Agent, or Firm*—Philip H. Von Neida; Salvatore P. Pace

(57) ABSTRACT

The present invention relates to a process for removing nitrogen oxides from gas streams such as furnace or utility boiler flue gas streams. An adsorber system is used to adsorb nitrogen oxides from the flue gas streams. An oxygen/ozone gas stream contacts the nitrogen oxides to convert the nitrogen oxides to $N_2O_5$ which will exit the adsorber with the oxygen stream.

15 Claims, 2 Drawing Sheets

REMOVAL OF NITROGEN OXIDES FROM GAS STREAMS

FIELD OF THE INVENTION

The present invention relates to a process for removing nitrogen oxides from gas streams. More particularly, the present invention provides for a process for contacting a flue gas stream containing nitrogen oxides with an ozone-containing oxygen stream in an adsorption/reaction unit, thereby cleaning the flue gas of nitrogen oxides and allowing for recovery of oxygen.

BACKGROUND OF THE INVENTION

Recent federal and local environmental laws require very significant reduction of discharge of harmful gaseous substances into the atmosphere. Chief among such harmful air pollutants are nitrogen oxides ($NO_x$). In response to strict enforcement efforts of these laws, industrial air polluters have made considerable efforts to reduce the amount of these harmful substances into the air in gaseous effluents from industrial or municipal sources. Successful efforts to reduce the concentration of $NO_x$ in gaseous effluents often involve reacting the $NO_x$ in waste gases with nitrogen-based reducing agents. One commercially used method of reducing $NO_x$ from gas streams involves contacting the $NO_x$ with ammonia or an ammonia precursor, such as urea, in the absence of a catalyst, a technique known as selective non-catalytic reduction (SNCR). The ammonia reduces the $NO_x$ to nitrogen while itself being oxidized to nitrogen and water. SNCR processes require very high temperatures, for instance temperatures in the range of about 800 to 1200° C., and even at these temperatures only low conversions of $NO_x$ are achieved. For example, it is not uncommon to attain $NO_x$ reductions only in the range of 40 to 50% by SNCR-based processes.

Another technique for removing $NO_x$ from waste gas streams involves contacting the waste gas with ammonia or an ammonia precursor in the presence of a substance which catalyzes the reduction of $NO_x$ to nitrogen, as in SNCR processes. These catalytic reduction processes are referred to as selective catalytic reduction (SCR). SCR processes have a few advantages over SNCR processes. They can be carried out at temperatures significantly lower than the temperatures at which SNCR processes are carried out. For example, they are quite effective at temperatures in the range of about 250 to 600° C. Although SCR processes are more efficient than SNCR processes in the reduction of $NO_x$ to nitrogen, they have the disadvantages of being more costly than SNCR processes, the catalyst can be poisoned or deactivated and often they do not remove all of the $NO_x$ from the gas stream being treated.

Another disadvantage of both SCR and SNCR processes is that ammonia, which itself is regarded as an environmentally unacceptable pollutant, is often released into the atmosphere in the gaseous effluent from the reactor because the reactions are often conducted in the presence of excess ammonia and/or because of sudden changes in the process that produces less than expected $NO_x$. Ammonia may also be released because of depletion or masking of the catalyst by contamination over time.

Another known method of removing $NO_x$ from gas streams involves contacting the $NO_x$ with ozone, thereby oxidizing them to higher nitrogen oxides, such as $N_2O_5$ and removing the higher oxides from the gas stream by means of aqueous scrubbers.

Specific details of ozone-based $NO_x$ oxidation processes are disclosed in U.S. Pat. Nos. 5,206,002 and 5,316,737, the disclosures of which are incorporated herein by reference. Ozone-based $NO_x$ oxidation processes can be expensive because of the high cost of producing ozone and require efficient use of ozone to reduce costs.

Because of stringent environmental regulations, efforts are continuously made to improve $NO_x$ removal processes to minimize or eliminate emission of $NO_x$ into the atmosphere. This invention provides a process which accomplishes this objective.

SUMMARY OF THE INVENTION

The present invention provides for a process for removing nitrogen oxides ($NO_x$) from gas streams, particularly flue gas streams. The process comprises feeding a gas stream that contains nitrogen oxides as an impurity therein to an adsorber where the nitrogen oxides are adsorbed during the adsorption cycle. During the regeneration cycle an ozone/oxygen stream is fed to the adsorber. The ozone will react with the adsorbed nitrogen oxides and form $N_2O_5$. The $N_2O_5$ will flow out from the adsorber with the oxygen stream to a scrubber system such that the oxygen can be recycled as feed to the ozone generation unit. The treated flue gas stream can be discharged to the atmosphere or directed to other treatment systems.

In another embodiment of the present invention, the nitrogen oxides-containing stream may be a chemical processing stream such as a metal pickling, FCC or food processing stream.

DETAILED DESCRIPTION OF THE INVENTION

The present invention provides for a process for removing nitrogen oxides ($NO_x$) from a gas stream comprising feeding the nitrogen oxides-containing gas stream to an adsorber such that nitrogen oxides are adsorbed; feeding an oxygen/ozone gas stream to the adsorber such that the ozone will contact the adsorbed nitrogen oxides and convert them to $N_2O_5$.

In the process of the present invention, an ozone/oxygen gas stream is produced by an oxygen generator and an ozone generator and is fed to the adsorber during the regeneration part of the cycle to remove adsorbed $NO_x$. This stream when exiting the adsorber will be composed primarily of oxygen and the $N_2O_5$ which is formed when the nitrogen oxides adsorbed on the adsorber react with the ozone. This stream can then be fed to a wet scrubber system where the $N_2O_5$ is dissolved in water forming nitric acid and the clean oxygen stream recycled through additional clean-up steps to the ozone generator.

Figure 1:
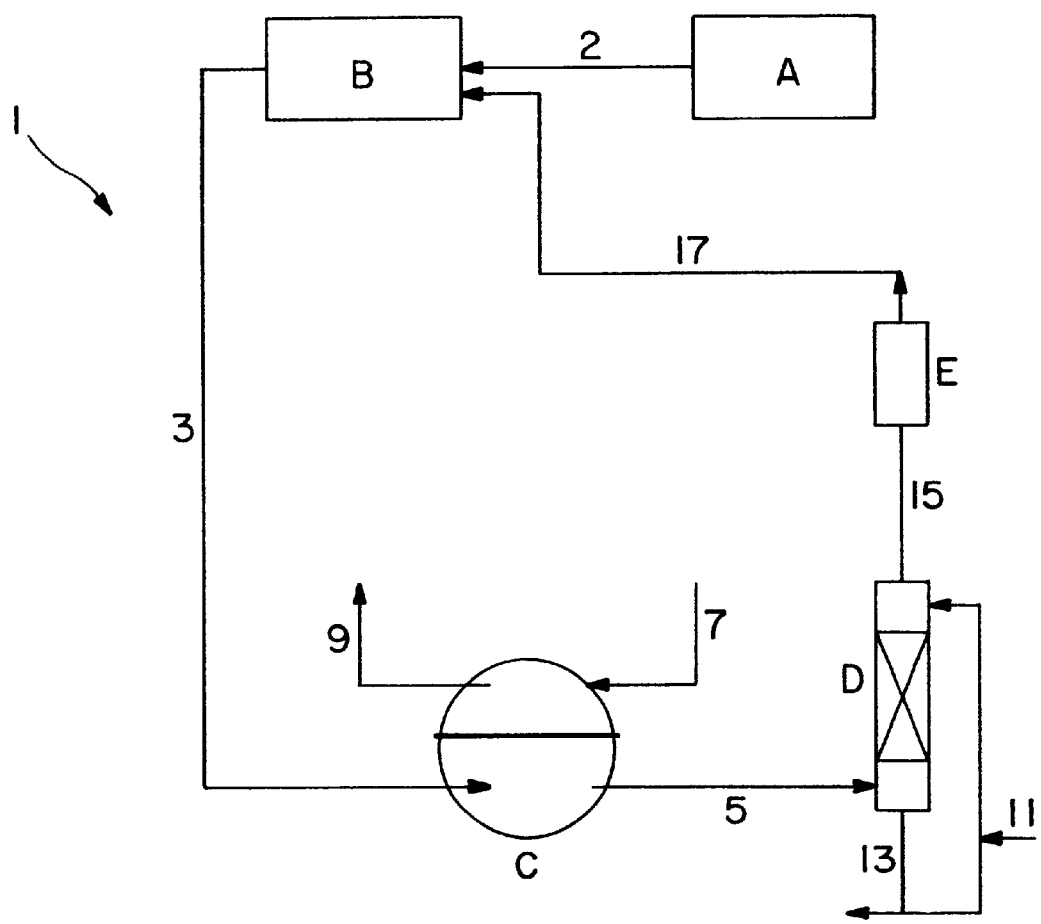
FIG. 1 is a schematic representation of a gas generation and purification system under which the present invention can be practiced.

For a more detailed description of the invention, reference is made to FIG. 1. Oxygen generator A provides oxygen to ozone generator B through line 2. The oxygen generator can be any equipment that produces oxygen or oxygen-enriched gas from air. Typically, the generator is an adsorption unit or a cryogenic air separation plant. Alternatively, oxygen or oxygen-enriched air can be introduced into the system from an external source such as a liquid oxygen tank.

The ozone generator B can be any type of ozonizer, such as a high voltage corona discharge generator. Typically, the ozone-containing gas comprises about 3 to about 10% by weight ozone with the balance being, depending on the feed, oxygen or air components. The ozone generator connects to the adsorber C through line 3 through which the ozone/oxygen mixture passes. This stream is heated to a temperature between 50 and 150° C. before it is sent to adsorber C. The heater is not shown in FIG. 1.

The adsorber receives the gas stream containing the nitrogen oxides through line 7. The nitrogen oxide-containing gas stream can be any gas stream containing nitrogen oxides but is typically a flue gas stream such as that from a furnace or utility boiler.

The adsorber C can be either a multi fixed-bed configuration for the adsorption and regeneration cycles or it can be a rotary wheel. For the fixed bed configuration, the standard thermal swing adsorption cycles are used. In the case of a rotary wheel adsorber, it can be in the form of a disk or a cylinder and is constructed from a structured sorbent which is compartmentalized into at least two sectors. The rotary wheel adsorbent is rotated such that alternating adsorption and regeneration cycles occur as the rotor moves through different sectors which are separated by a rotary seal. The rotary wheel can be configured such that the $NO_x$-containing gas is passing through the adsorption section for a set time interval and then the ozone/oxygen mixture is passing through the regeneration section of the rotor wheel over a set interval of time. These time intervals will vary of course depending upon not only the level of contamination of the gas stream being treated but also the structured sorbent material employed. Typical cycle times range between 5 and 60 minutes.

The sorbent material in fixed bed and rotary wheel processes can be an adsorbent or a chemisorbent. Supported metal oxides can be used as chemisorbents. The adsorbents to remove $NO_x$ include supported MgO, γ-alumina, Y zeolites such as USY (ultrastable Y), $Na_2CO_3$ treated γ-alumina and KOH treated γ-alumina. The preferred adsorbents include γ-alumina and treated γ-aluminas.

Figure 2:
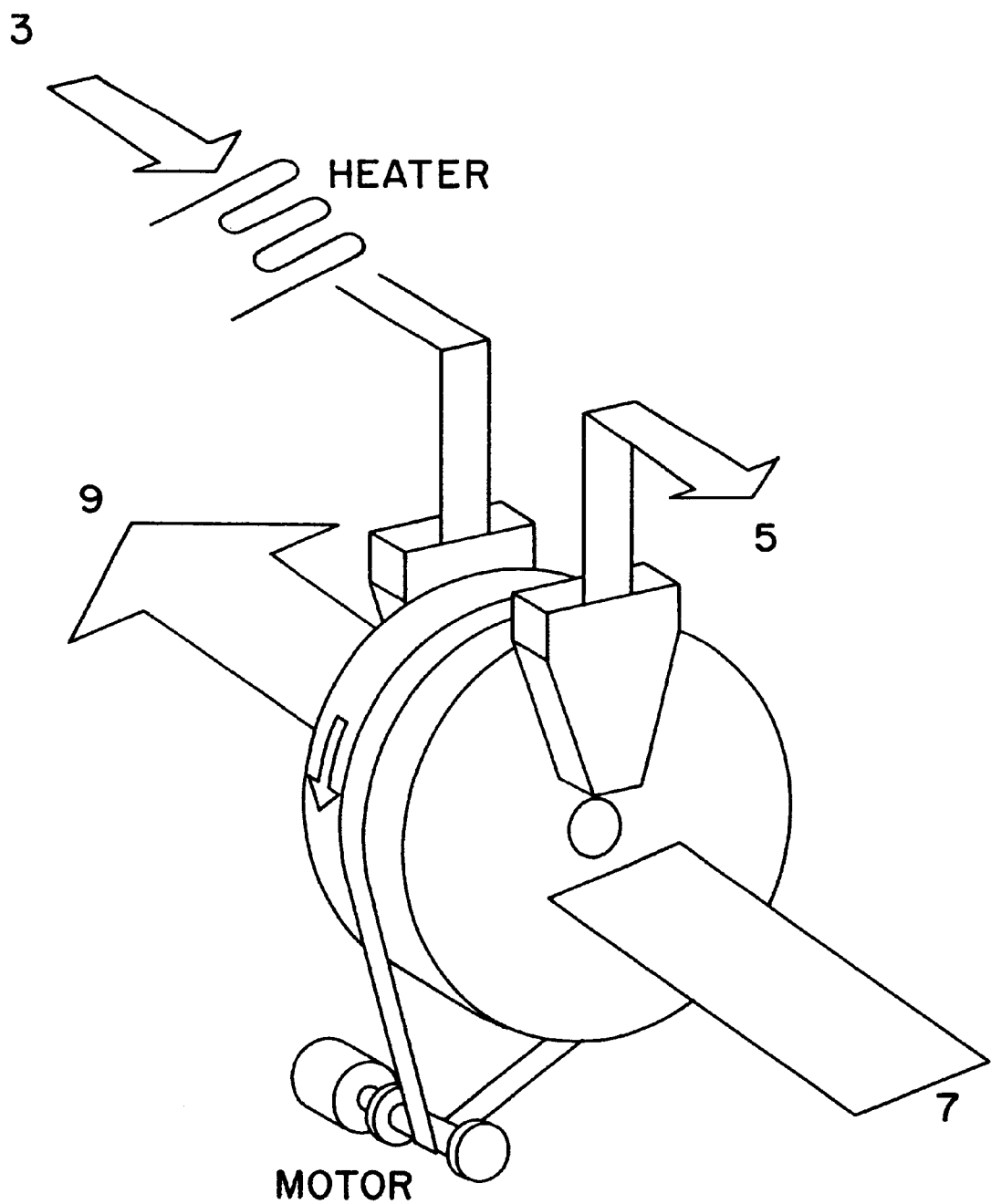
FIG. 2 is a schematic showing the operation of the rotary wheel adsorption system for the present invention.

The treated nitrogen oxides-containing gas stream is now essentially free of nitrogen oxides and exits the adsorber via line 9 where it is sent for further treatment or discharged to the atmosphere. The regeneration stream from the adsorber exits through line 5. Operation of the adsorber unit C when a rotary wheel is used is schematically shown in FIG. 2. Adsorbent wheel is rotated using a motor. $NO_x$ containing stream enters as stream 7 and the purified stream exits as stream 9. Ozone/oxygen containing stream enters as stream 3, is heated in the heater, regenerates the adsorbent by reacting with adsorbed $NO_x$ and exits as stream 5.

Stream 5 comprises mostly oxygen or air, depending on the feed to the ozone generator with $N_2O_5$, $HNO_3$ and water and enters the scrubber system D. Scrubber system D is outfitted with a scrubbing liquid feed line 11, scrubbing liquid discharge line 13 and purified gas discharge line 15. The scrubber may be any suitable vessel and can be equipped with baffling or an inert material to enhance contact between the scrubbing liquid and the gas that is being purified.

The aqueous liquid scrubbing step is preferably carried out at a pH greater than 7, and is most preferably carried out at a pH greater than 9. The aqueous liquid may be water, in which case a dilute aqueous nitric acid solution will be produced. However, in preferred embodiments, the aqueous liquid is a dilute basic solution. Suitable basic aqueous solutions include alkali metal hydroxides, such as sodium hydroxide, potassium hydroxide, etc. and alkaline earth metal hydroxides, such as calcium hydroxide, magnesium hydroxide, etc. and ammonium hydroxide. Preferably the aqueous solution contains a base having good water solubility, such as sodium hydroxide, potassium hydroxide, ammonium hydroxide, etc. A more preferred caustic solution is aqueous sodium hydroxide, which is readily available, relatively inexpensive and produces environmentally acceptable products upon reaction with the flue gas components. The temperature and pressure at which the aqueous scrubbing step is carried out are not critical. This step is typically carried out at a temperature in the range of about 10° to about 90° C., and is preferably carried out at a temperature in the range of about 20° to about 60° C. and is generally carried out at about atmospheric pressure. The scrubbing liquid can be either in the form of a spray if the scrubber is a hollow chamber or a trickle stream if the scrubber is packed with inert packing. The scrubbing liquid washes out the $N_2O_5$ and/or $HNO_3$ from the gas being treated and passes out line 13 as a dilute nitric acid or nitrate solution.

The purified gas stream which is substantially depleted of nitrogen oxides is directed via line 15 to an additional oxygen cleanup unit E where water and other impurities are removed. This cleaned oxygen stream is further directed from the cleanup unit E through line 17 to the ozone generator.

It will be appreciated that it is within the scope of the present invention to utilize conventional equipment to monitor stream concentrations and automatically regulate the flow of the various process streams within the system so that the system can be fully automated to run continuously in an efficient manner.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A process for removing nitrogen oxides from a gas stream comprising:

feeding said gas stream to a nitrogen oxides adsorber selected from the group consisting of a multi-fixed bed adsorber and a rotary wheel adsorber containing a metal oxide based chemisorbent or an adsorbent selected from the group consisting of Y zeolites, γ-alumina, treated γ-alumina and supported MgO, whereby said nitrogen oxides are adsorbed in said adsorber; and feeding an ozone and oxygen containing gas stream to said adsorber, whereby said ozone reacts with said nitrogen oxides to form $N_2O_5$.

2. The process as claimed in claim 1 wherein said rotary wheel adsorber alternates between adsorption and regeneration sections as said rotary wheel rotates.

3. The process as claimed in claim 1 wherein said ozone and oxygen gas stream is provided by an ozone generator.

4. The process as claimed in claim 3 wherein said ozone and oxygen gas stream contains from about 3 to 10% by weight ozone.

5. The process as claimed in claim 3 wherein the oxygen from said adsorber is recycled to the ozone generator.

6. The process as claimed in claim 1 wherein said rotary wheel adsorber comprises at least two sectors.

7. The process as claimed in claim 1 wherein said gas stream passes through said adsorption cycle and said oxygen and ozone gas stream passes through said regeneration cycle.

8. The process as claimed in claim 1 wherein the oxygen and ozone containing stream is heated to a temperature of 50–150° C. before being sent to said adsorber.

9. The process as claimed in claim 1 wherein said $N_2O_5$ is contained within an oxygen stream and is fed to a wet scrubber system.

10. The process as claimed in claim 9 wherein said wet scrubber system contains a dilute basic aqueous solution.

11. The process as claimed in claim 1 wherein said nitrogen oxides-containing gas stream also contains sulfur oxides.

12. The process as claimed in claim 1 wherein said nitrogen oxides-containing gas stream is a flue gas stream.

13. The process as claimed in claim 12 wherein said flue gas stream is a furnace or utility boiler flue gas stream.

14. The process as claimed in claim 1 wherein said nitrogen oxides-containing gas stream is a chemical processing stream.

15. The process as claimed in claim 14 wherein said chemical processing stream is selected from the group consisting of metal pickling, fluid catalytic cracker and food processing streams.

* * * * *